Patented June 3, 1930

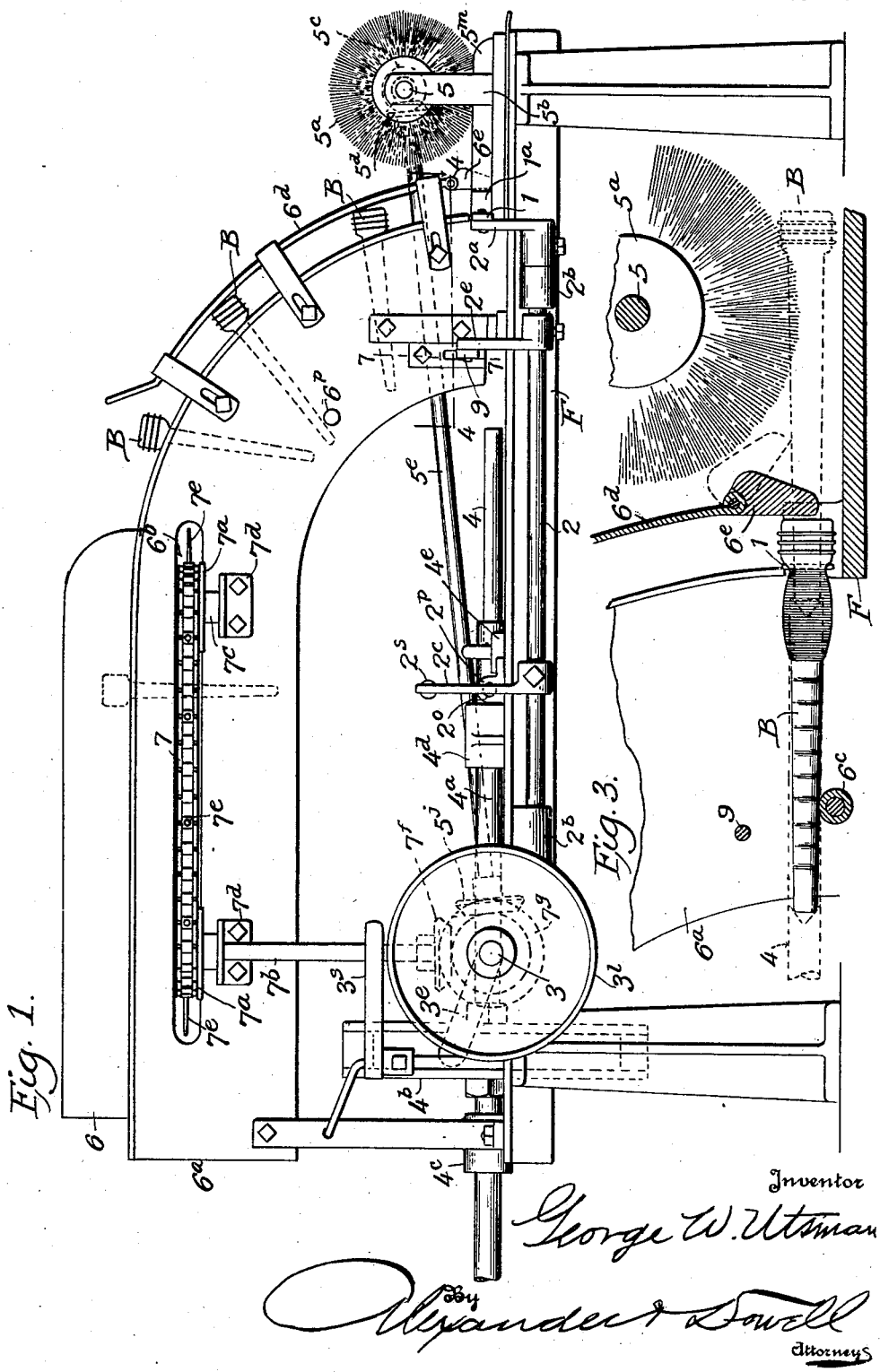

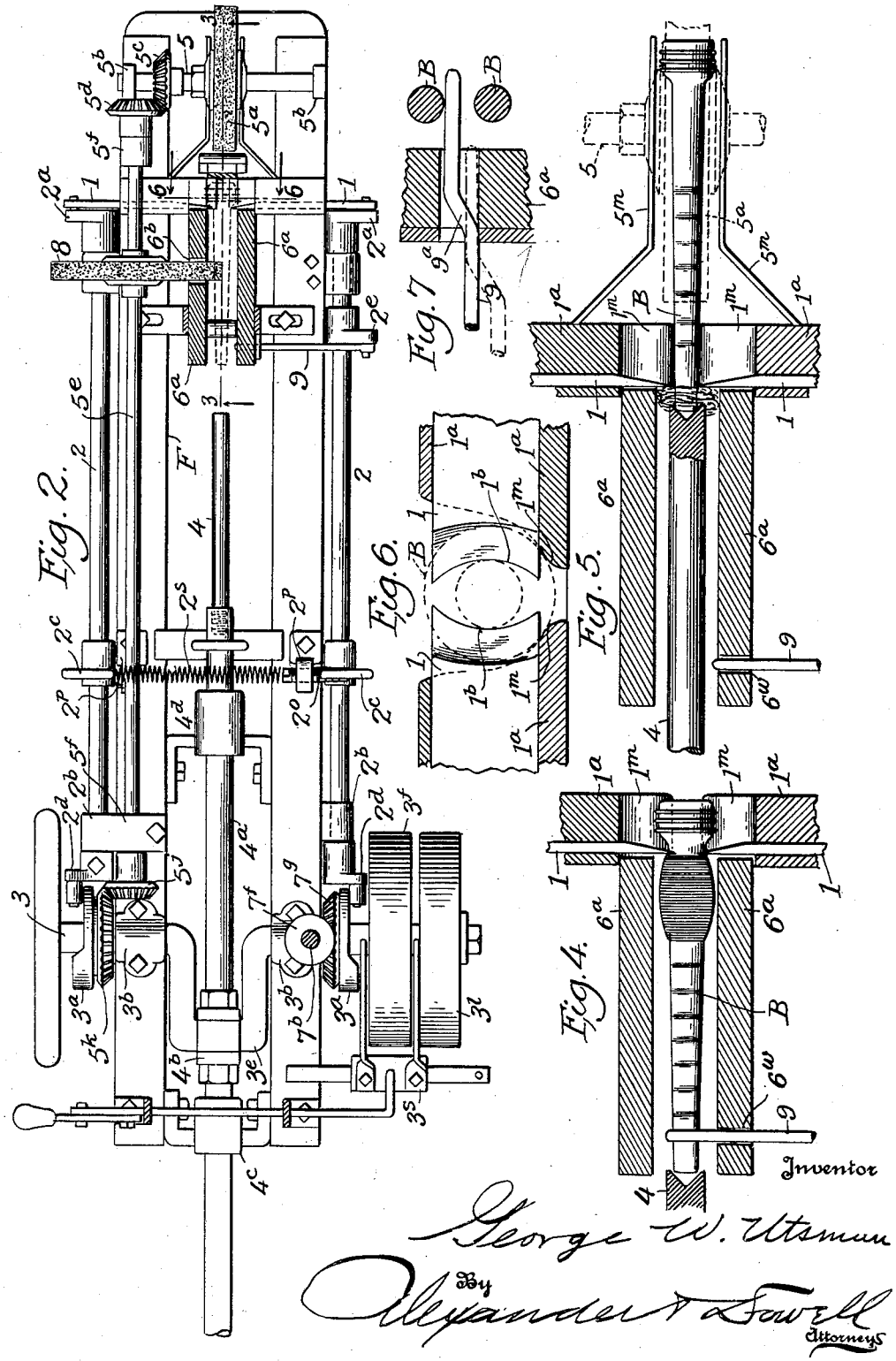

1,761,695

UNITED STATES PATENT OFFICE

GEORGE W. UTSMAN, OF WEST HILLSBORO, NORTH CAROLINA, ASSIGNOR OF ONE-HALF TO CHARLES H. ROBERTSON, OF WEST HILLSBORO, NORTH CAROLINA, AND ONE-HALF TO THOMAS O. SUMMEY, OF WEST HILLSBORO, NORTH CAROLINA

QUILL-CLEANING MACHINE

Application filed March 21, 1929. Serial No. 348,960.

This invention is a novel improvement in machines for stripping bobbins or quills and the like to remove waste from the stems quickly and thoroughly. Another object is to provide a machine which will not damage the quills in removing the short ends or waste therefrom, and which is capable of handling rayon cops as well as cotton or wool quills.

Another object of the invention is to provide a machine which will do more and better work with less labor and damage to the quills than machines now on the market; and which will be simple, durable and efficient, and can be maintained in service with much less expense than the present known machines.

The novel machine in brief comprises a hopper, means by which quills may be removed from the hopper and presented to the stripping blades, means for pushing the quill between the blades so that waste will be stripped therefrom in a manner which will not put any strain upon the steel rings on the head of the quill (which in machines heretofore employed have been subject to strains that loosen them and render the quill unfit for use.)

The accompanying drawings illustrate one practical embodiment of the invention, and an explanation thereof will enable others to adapt and use the invention. The essential features of the invention and novel features of construction and noved combinations of parts for which protection is desired are summarized in the claims.

In the drawings;

Fig. 1 is a side elevation of the complete machine.

Fig. 2 is a top plan view thereof with the hopper removed and the chute broken away.

Fig. 3 is an enlarged detail section on the line 3—3 Fig. 2.

Fig. 4 is an enlarged detail section on the line 4—4 Fig. 1.

Fig. 5 is a similar view showing the quill about to be discharged from between the strippers.

Fig. 6 is an enlarged detail section on the line 6—6, Fig. 2.

Fig. 7 is a detail section on the line 7—7, Fig. 1.

In the machine shown in the drawings two oppositely disposed stripping blades 1 are slidably mounted in guides $1^a$ mounted upon opposite side members of the main frame F, which may be of any suitable construction, upon which the operative parts of the machine are mounted.

The inner ends of these stripping blades are preferably notched as at $1^b$, so that when moved toward each other they can closely embrace the stem of a quill B, as indicated in Figs. 4 and 6. These blades 1 can be moved toward or from each other, at the proper times, by means of levers $2^a$ fixed to shafts 2 which are journaled in bearings $2^b$ attached to the side members of the frame F said shafts extending parallel at opposite sides of the frame. Each lever $2^a$ has a pin and slot engagement with the related stripping blade, and by rocking shafts 2 the stripping blades may be moved toward and away from each other.

In the construction shown the shafts 2 are preferably rocked to move the blades toward each other by means of a contractile spring $2^s$ which is connected to and between arms $2^c$ on the opposite shafts 2. The tension of this spring can be regulated by adjusting the arms on the shaft, or by any other suitable means, so that the stripper blades can be caused to bite the stem of a quill with any desired pressure.

In the machine shown the shafts 2 are further provided with arms $2^d$ which engage cams $3^a$ attached to a transverse shaft 3, said cams $3^a$ being so formed that during part of the rotation of the shaft 3 the stripping blades will be separated against the action of the spring $2^s$, and during the remainder of the rotation of the shaft 3 the fingers will be moved toward each other and held against a bobbin stem with any desired pressure under the action of the spring $2^s$. Said spring also serves to keep the levers $2^d$ in close contact with their respective cams.

The extent of inward movement of the stripping blades and the pressure with which they contact the quill stems may be regulated by means of adjustable stop bolts $2^o$ tapped through studs $2^p$ on the frame adjacent the arms $2^c$, which limit the inward movement of said arms. This enables a stiff spring to be used, and the bite of the stripping blades upon the quill stem to be regulated with nicety.

The shaft 3 is the main or drive shaft of the machine and is journaled in bearings $3^b$ on the main frame, see Fig. 2. Said shaft 3 may be driven by any suitable means. As shown it is provided with a fast pulley $3^f$ and a loose pulley $3^1$, which may be belted to any suitable driver, and is provided with an ordinary belt shifter $3^s$.

A quill or bobbin B to be stripped is positioned between the stripper blades as hereinafter described when they are separated, and after the stripper blades have closed thereupon the stem of the quill is pushed endwise between the stripper blade by pressure applied to the small end of the stem.

In the machine shown the stem is engaged by a push rod 4 preferably detachably attached to a reciprocatory bar $4^a$ which may be operated from shaft 3 by any suitable means. In the example shown bar $4^a$ is provided with a Scotch yoke $4^b$ engaged with a crank $3^e$ on the main shaft 3. The shaft $4^a$ is slidably supported in bearings $4^c$ and $4^d$ attached to the main frame at opposite sides of the yoke. The forward end of the shaft $4^a$ may be attached to a slide bar $4^e$ supported and guided on the opposite side members of the frame 2, as indicated in the drawings.

The push rod 4 is preferably adjustable and removably connected with the rod $4^a$ and may be changed to suit the nature or size of quills or cops being stripped. For an ordinary quill the end of the push rod is preferably recessed to receive the rounded end of the quill stem and this prevents fracturing the stem when the push rod contacts therewith.

The push rod will force the quill stem between the stripper blades, which will strip the waste therefrom, and, in the machine shown, the stripped quill is discharged into a guide 5 which directs it under a circular brush $5^a$ by which the bobbins are quickly discharged into any suitable receiver. In the machine shown the brush $5^a$ is mounted on a transverse shaft 5 journaled in bearings $5^b$ on the frame, and a bevel gear $5^c$ on one end of shaft 5 meshes with a bevel gear $5^d$ on one end of a counter shaft $5^e$, journaled in brackets $5^f$ on the main frame, and a bevel gear $5^j$ on the shaft $5^e$ meshes with a bevel gear $5^k$ mounted on shaft 3, see Fig. 2. By this means brush $5^b$ will be rotated when the machine is in operation.

The quills could be fed to the strippers by hand; but I provide automatic means for feeding the quills. As shown a feed hopper 6, which may be of any suitable construction, is mounted on the frame and is provided with a longitudinal slot in its bottom below which is a quill chute comprising opposite side by side members $6^a$ which extend beneath the hopper and the forward ends thereof curve downwardly toward and just in rear of the stripping blades. The space between members $6^a$ form a quill guide slot. A number of quills may be thrown into the hopper and their stems will by gravity drop through the opening in the bottom of the hopper and will enter and be suspended in the horizontal portion of the chute. The stems hanging in the chute may be moved forward along the chute by any suitable means, and the quills will successively drop into position for stripping, each with its head projecting beyond the stripper blades 1 and its stem lying to the innerside of the said blades. The head of the lowermost quill in position for stripping will be supported on the inner ends $1^m$ of the guides $1^a$ (see Figs. 4 and 6) while its stem rests on and is supported in alinement with the push rod 4 by a bar $6^c$, by which bar the lower end of the chute $6^a$ is supported on the main frame adjacent the strippers. The rear end of the hopper and chute may be supported on the frame by uprights as shown.

As the quill passes the curved end of the chute the lower end of its stem is arrested by a pin or bolt $6^p$, which pin will be cleared by the end of the stem when the quill has assumed a substantially horizontal position and can drop bodily vertically into position for stripping.

To prevent the quills falling out of the chute as they descend the forward curved end thereof a curved guide bar $6^d$ is attached to the curved end of the chute, as shown. To the lower end of this guide plate $6^d$ is preferably hingedly attached a gravital weighted retainer $6^e$ which yieldingly engages the head of the quill dropping into position to be stripped and keeps it in place prior to the stripping operation.

The quills may be fed toward the chute beneath the hopper by means of an endless belt or chain 7 running over guide pulleys $7^a$ on vertically disposed shafts $7^b$, $7^c$ mounted in bearings $7^d$ attached to one side wall of the chute $6^a$, said belt having spaced projecting spring fingers $7^e$ which are adapted to project through a slot $6^b$ in the adjacent side of the chute $6^a$ and below the hopper 6, and engage the quill stems hanging in the chute and move them toward the curved end of the chute, through which they will pass by gravity to the stripping point. The belt 7 may be driven by any suitable means. As shown the shaft $7^b$ of one of the pulleys $7^a$ has a bevel gear $7^f$ on its lower end engaging a correspondingly beveled gear 7ᵍ on shaft 3.

A rotary brush 8 may be mounted on the shaft 5ᵉ adjacent the feed end of the chute, and project into the chute through a slot 6ᵇ in the side thereof, as shown in Fig. 1 to assist in feeding and positioning the quills in the chute. When the pusher rod 4 is retracted out of its way the lowermost quill in the chute drops into position for stripping. To prevent the pusher rod simultaneously engaging two quill stems and to certainly position the stem of the lower quill so it will be properly engaged by the pusher, I provide quill positioning means. In the construction shown this means comprises a reciprocable rod 9 the inner end of which is adapted to be entered into the chute through an opening 6ʷ in the side thereof. The rod is bent at 9ᵃ in such a manner that when it is moved inward this bend will cause the inner end of the rod to raise after it is entered into the chute, but when it is drawn outwardly, out of the way of the stem, its inner end will lower. This rod has its outer end pivotally connected with an arm 2ᵉ on the adjacent rock shaft and is moved thereby at the proper times into and out of the chute. The lowermost quill drops into position for stripping when the pusher 4, rod 9 and stripping plates 1 are retracted out of the way. When the pusher starts forward, and before it engages the stem, the positioning member 9 moves inward and its inner end will first engage the stem of the lowermost quill, and hold it in position for engagement by the pusher; and before the pusher engages the stem the positioning member 9 moving inward lifts the stem of the next overlying quill upward and holds it raised so it can not be engaged by the pusher when the latter engages the lowermost quill.

In operation a number of quills to be stripped are dumped into the hopper; and naturally the stems of the lowermost quills drop through the slot into the chute when their heads rest on the upper edges of the chute. The quills depending into the chute are advanced towards the curved end of the chute by the fingers on the belt 7, and will drop by gravity at the curved end of the chute to the bottom thereof. Assuming that the pusher 4 and positioning member 9 and stripping blades 1 have been retracted out of the way and the lowermost quill in position for stripping; the pusher bar starts toward the quill but before it reaches it the stripping fingers 1 are moved inward and grip the stem of the bobbin just behind its head, see Figs. 2 and 4, then the member 9 positions the stem of the lowermost quill and raises the stem of the next superimposed quill out of the way; then the pusher engages the stem of the quill and forces it head first between the stripping blades 1 and towards the brush 5. As the stem is thus forced outward the waste thereon is stripped off of it by the blades 1 and falls onto the floor, or into a suitable receiver (not shown) such as a basket placed beneath the frame of the machine, and the clean quill is discharged by the brush 5 into any suitable receiver.

The pusher 4 may be changed to suit the size and kind of quills or cops to be stripped. When the machine is to be used for stripping silk or rayon cops or quills, the stripping blades 1 are preferably made of wood, and lighter pressure employed to prevent injury to the stems of the cops, and also to prevent the blades becoming clogged with silk fibre which has a tendency to adhere to metal stripping blades, such as are used with cotton yarns.

I claim;

1. In a quill cleaning machine strippers adapted to engage the stem of the quill, means adapted to engage the stem of the quill and push it between the strippers, means for feeding quills to the strippers, and a reciprocatory member adapted to raise the stem of a quill overlying the quill in stripping position to prevent the raised stem being engaged by the pusher.

2. In a quill cleaning machine strippers adapted to engage the stem of the quill behind the head thereof, means adapted to engage the stem of the quill and push it between the strippers, means for opening the strippers to receive a quill when the pusher is retracted, and means for closing the strippers upon the quill before the pusher pushes the quill therebetween; with a rotary brush for assisting in feeding the quills to stripping position and a rotary brush for removing and discharging the stripped quill after it passes the stripping device.

3. In a quill cleaning machine, strippers adapted to engage the stem of the quill behind the head thereof, means adapted to engage the stem of the quill and push it between the strippers, means for opening the strippers to receive a quill when the pusher is retracted, means for closing the strippers upon the quill before the pusher forces the quill therebetween, means for feeding quills to the strippers, and a reciprocating angular rod adapted to raise the stem of a quill overlying the quill in stripping position so that said stem will not be engaged by the pusher.

4. In a quill cleaning machine of the character specified quill strippers adapted to nip the stem of a quill behind the head thereof, means for separating the strippers to admit a stem therebetween, means for positioning the quill between the strippers, and a pusher adapted to engage the stem of the quill and push it between the strippers to remove the adhering threads therefrom, a chute for directing quills to the strippers, and a device adapted to lift the stem of a quill overlying the quill in position to be stripped and prevent said stem being engaged by the pusher.

5. In a quill cleaning machine of the character specified, quill strippers adapted to nip a quill behind the head thereof, means for separating the strippers to admit a quill therebetween, means for positioning the quill between the strippers, a pusher adapted to engaged the stem of the quill and push it between the stripper to remove the adhering threads therefrom, means for reciprocating the pusher to and from the strippers, means for opening the strippers to receive a quill when the pressure is retracted, means for closing the strippers upon the quill before the pusher is advanced, a chute for directing quills to the strippers, and a device adapted to lift the stem of a quill overlying the quill in position to be stripped and prevent said stem being engaged by the pusher.

6. In a quill cleaning machine as set forth in claim 5 a rotary brush assisting in feeding the quills to stripping position; and a rotary brush for removing the stripped quills.

7. In a quill cleaning machine; a feed chute for directing quills to the strippers, a rotary brush at right angles to the chute and adjacent the discharge end thereof for moving the quills to stripping position, strippers adapted to engage the stem of the quill behind the head thereof, means adapted to engage the quill and move it between the strippers; and means for discharging the stripped quill.

8. In a quill cleaning machine; means for feeding quills, strippers adapted to engage a quill behind the head thereof, means for positioning a quill between the strippers, a pivoted gravital weight adapted to engage the head of the quill and retain it in stripping position; a pusher rod adapted to push the quill past the weight and between the strippers, means for reciprocating the pusher rod, rock shafts operatively connected with the strippers, cams for operating the rock shafts to separate the strippers when the pusher is retracted, and spring means for operating the rock shafts to close the strippers upon a quill before and while the pusher engages the quill.

GEORGE W. UTSMAN.